March 22, 1932.    M. WATTER    1,850,251
AIRCRAFT
Filed Nov. 7, 1930    3 Sheets-Sheet 1

INVENTOR
Michael Watter,
BY
ATTORNEYS

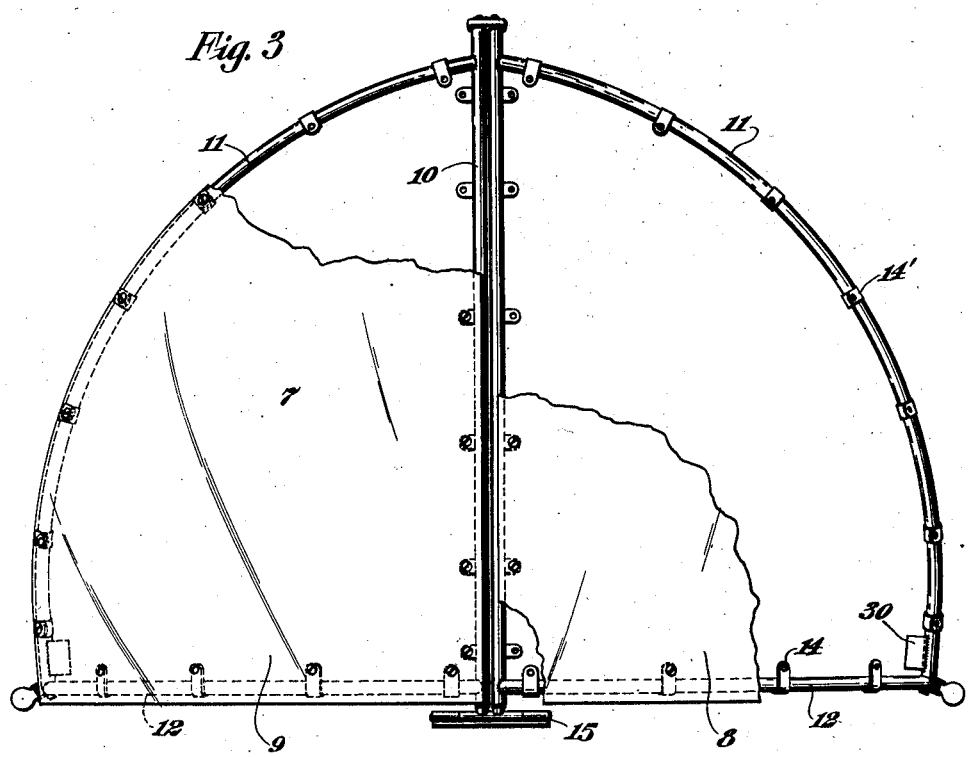
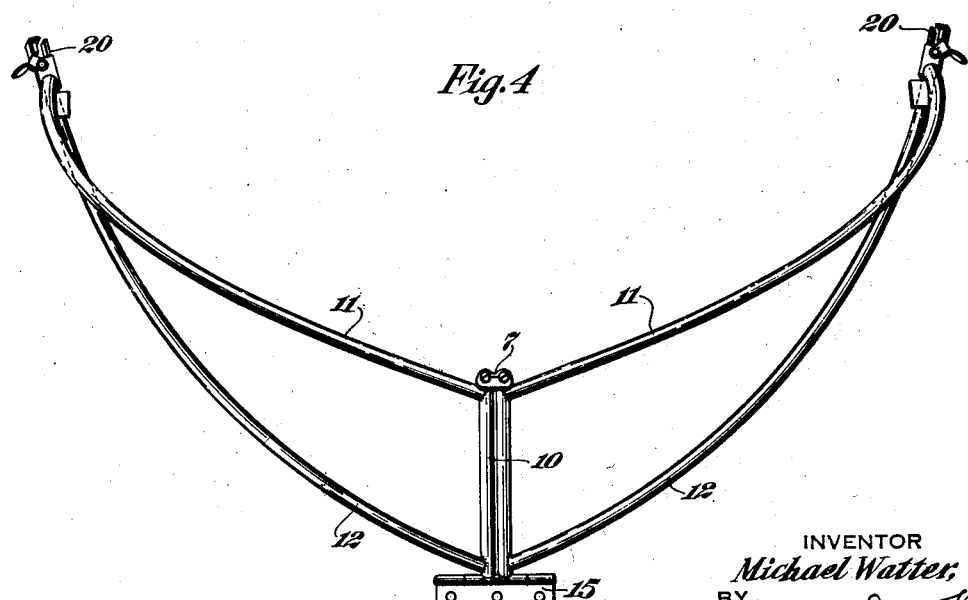

March 22, 1932.  M. WATTER  1,850,251
AIRCRAFT
Filed Nov. 7, 1930   3 Sheets-Sheet 3

INVENTOR
Michael Watter,
BY
ATTORNEYS

Patented Mar. 22, 1932

1,850,251

UNITED STATES PATENT OFFICE

MICHAEL WATTER, OF HARTFORD, CONNECTICUT, ASSIGNOR TO CHANCE VOUGHT CORPORATION, OF HARTFORD, CONNECTICUT, A CORPORATION OF DELAWARE

AIRCRAFT

Application filed November 7, 1930. Serial No. 494,082.

My invention relates to aircraft and particularly to fuselages for airplanes.

The object of the invention is a fuselage or aircraft body having incorporated thereon as a part thereof an adjustable wind shield, and particularly a wind shield mounted just forward of and around the fore part of an open cock pit, capable of ready adjustment by the occupant of the cockpit and conforming to the contour of the fuselage in all adjusted positions.

For a better understanding of the above indicated and other novel features of my invention reference may be had to the drawings forming a part of this application wherein:

Fig. 3 is a front elevation,

Fig. 4 is a plan view of the wind shield frames and hinge,

Figure 1:
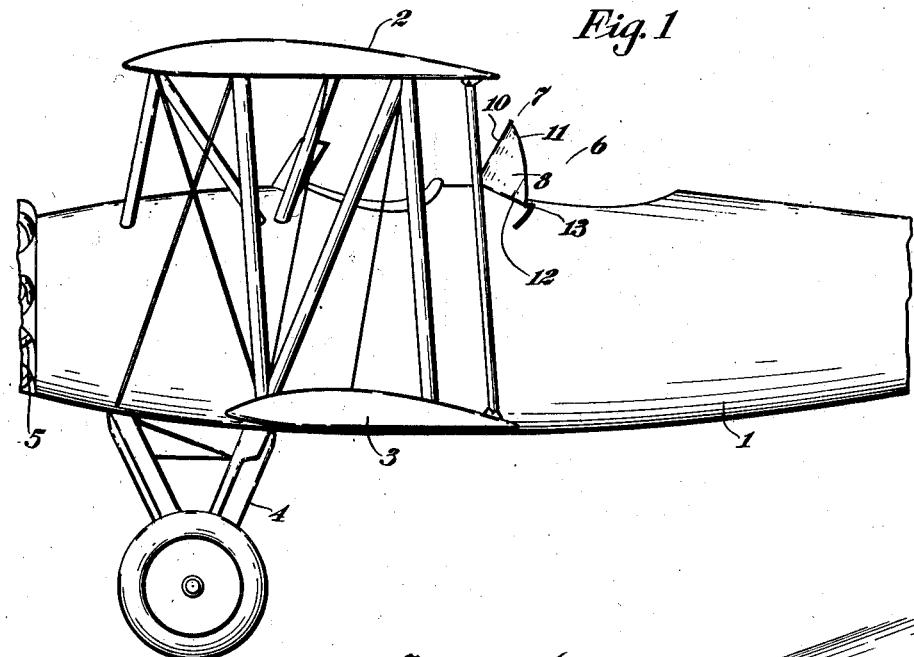
Fig. 1 is a side view of an airplane embodying the invention.
Figure 2:
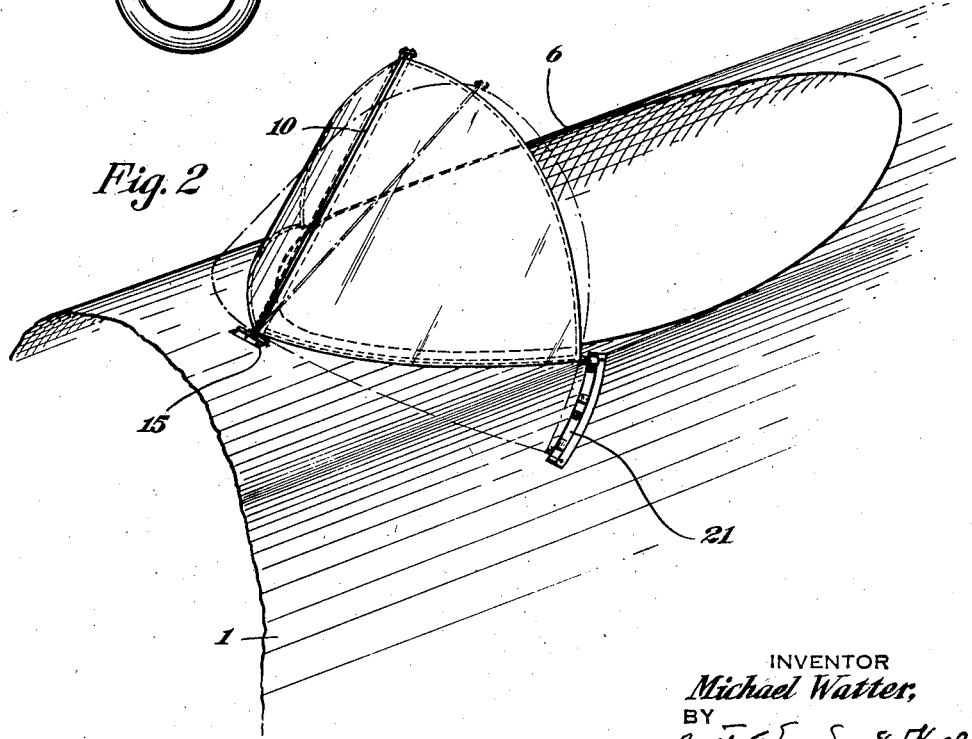
Fig. 2 is a perspective view of a part of the cockpit and the windshield.
Figure 5:
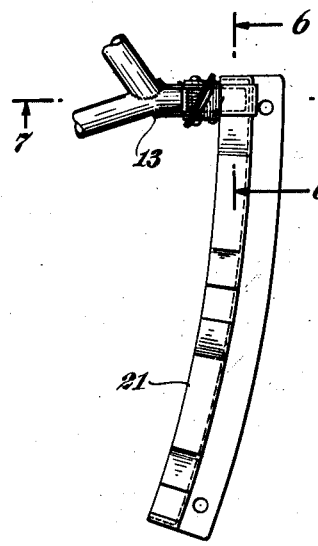
Fig. 5 is a detail view of the guide and locking means for the outer panels or frames of the wind shield.
Figure 6:
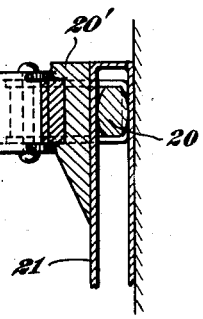
Fig. 6 is a section through 6—6 of Fig. 5.

I have shown my invention as embodied in an airplane having a fuselage 1, biplanes 2 and 3, landing gear 4 and power plant 5. The fuselage 1 has two open cockpits therein and I have shown my invention as embodied in that part of the fuselage just forward of the rear cockpit 6, but it is understood that the invention may be applied to the forward cockpit also if desired. The fuselage is of conventional form having a stream lined rounded contour and is provided with a multi wing or panel wind shield 7 mounted just forward of and encircling the fore part of the cockpit 6. In the particular embodiment shown the shield 7 comprises two three-sided curved panels 8 and 9 which are adjustably connected together at their forward upwardly extending edges 10, with the upper and lower edges 11 and 12 of each panel converging together and terminating in an adjustable connecting part 13 with the side of the fuselage adjacent the rim of the cockpit. By moving the connecting parts 13 up and down as indicated in Figs. 1 and 2 and variably connecting them with the sides of the fuselage the height of the wind shield may be readily varied, thereby enabling the pilot or observer to obtain the exact height desired, and the under sides 12 of the panels are formed to conform substantially to the contour of the fuselage throughout the range of adjustment.

Figure 8:
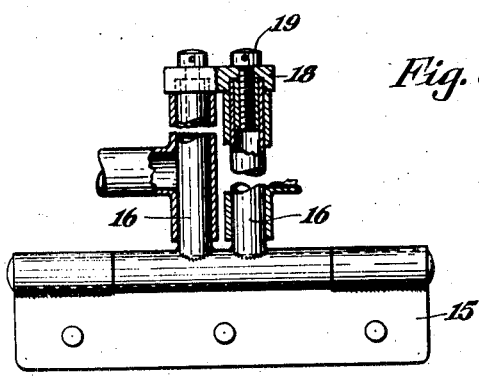
Fig. 8 is a detail view of the wind shield hinge.

The frames of the panels are preferably made of metal tubing with welded joints thus minimizing weight. A sheet of mica, celluloid or other transparent material is secured to each of the frames by bolts 14 passing through the mica and clips 14' on the frame. The clips are tack welded and brazed to the frame. The panels 8 and 9 are connected at their forward edge 10 to the fuselage by a transverse hinge 15, and the vertical uprights of the frame being hollow slide over the arms 16 of hinge 15 (Fig. 8). The hinge 15 has two parallel hollow arms 16, drilled and tapped at the top to receive screw 19. The frames are held in place by collar 18 which is recessed to fit over the hinge arms and bear against the frame top. Tap bolts 19 secure the collar in place, and it will be noted that the collar spans both arms of the hinge adding to the rigidity of the structure. This construction permits the frames to be swung in a plane about the arms 16 as axes. When hinge 15 (Fig. 2) is secured to the fuselage the arms 6 may be swung in vertical planes about the axis of the hinge. The result is that the panels may be swung in a plane at right angles to and about the arms 6 of the hinge and in the vertical plane about the axis of the hinge, thus permitting varied adjustments of the windshield.

Figure 7:
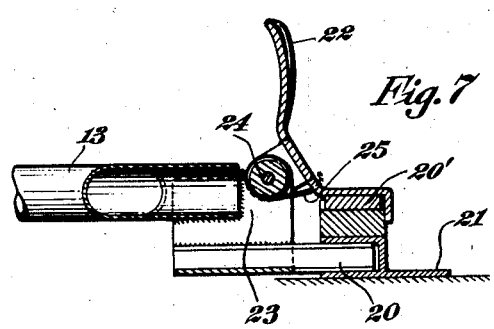
Fig. 7 is a section through 7—7 of Fig. 5.

This adjustment is controlled by members 20 (Fig. 4) which slide in the groove guides 21. To hold a member 20 in any fixed position, a locking lever 22 (Fig. 7) fits into notches 20' on the guide 21. The notches are rigidly secured to the guide members and are ramp sided to permit the locking lever to slide into place when in alignment with the notches. Spring 25 will cause the locking member to snap into place. The plate member 23 is welded to the frame part 13. The member 20 projects from plate 23 and slides in guide 21. The locking lever 22 rotates on pin 24 which passes through the pilot plate and the lever. The lever is lifted by applying a force to overcome the tension of spring 25, when the force is released the spring causes the lever to snap back against the guide fitting into a notch of guide block 21 preventing the frame from shifting.

The bottom members of the frames are constructed to follow the contour of the fuselage as the angle of the wind shield is shifted, thus preventing air leakage at that point.

I claim:

1. In an airplane, a fuselage, a multi-panel windshield hingedly mounted on said fuselage for fore and aft pivoting movements, the inner edges of the panels being hinged together, guideways on the sides of the fuselage, the outer panels having guide and holding members traversing said guideways, and means for locking the panels in any adjustable position, the lower edges of the panels being shaped to substantially conform to the contour of the fuselage in all adjusted positions.

2. In an airplane, a fuselage, a multi-panel windshield hingedly mounted on said fuselage for fore and aft pivoting movements, the inner edges of the panels being hinged together, guideways on the sides of the fuselage, the outer panels having guide and holding members traversing said guideways, and means for locking the panels in any adjustable position.

3. In an airplane, a fuselage, a multi-panel adjustable wind shield having its panels adjustably hinged and mounted on the fuselage, the lower edges of the panels being curved to approximately follow the contour of the fuselage and cooperating means carried respectively by the outer panels and the fuselage for adjusting and locking the shield in a number of different positions relative to the fuselage.

4. In an airplane of the character set forth in claim 2 wherein the wind shield is mounted on the fuselage by means of a transverse hinge and the guideways are disposed at an angle to the axis of the hinge.

5. In an airplane of the character set forth in claim 2 wherein the windshield is mounted upon the fuselage to encircle the fore part of an open cockpit with the guideways being positioned to cause the elevation and lowering of the upper edge of the windshield when the holding members are moved back and forth therein.

6. In an airplane, a fuselage, and a multi-panel adjustable windshield for said fuselage comprising an upwardly disposed arm pivoted to the fuselage and free to move in a vertical plane, the inner frame members of the panels being adjustably mounted on the arm, and the lower frame members being shaped to conform to the contour of the fuselage, and cooperating means carried respectively by said lower frame members and the fuselage for adjusting and locking the shield in a number of different positions relative to the fuselage.

7. In an airplane, a fuselage, and a multi-panel adjustable windshield for said airplane comprising two upwardly disposed parallel arms pivoted to the fuselage and free to move in vertical planes, the inner frame members of the panels being adjustably mounted on the arms, and the lower frame members being shaped to conform to the contour of the fuselage, and cooperating means carried respectively by said lower frame members and the fuselage for adjusting and locking the shield in a number of different positions relative to the fuselage.

8. In an airplane, a fuselage, a multi-panel adjustable windshield for said airplane having its panels adjustably hinged and mounted on the fuselage, connecting members at the extremities of the panels and guides for said members curved to conform to the curvature of the fuselage.

9. In an airplane, a fuselage, a multi-panel adjustable windshield for aircraft having its panels curved to encircle the fore part of a cockpit and adjustably hinged and mounted on the fuselage, and cooperating means carried respectively by the outer panels and the fuselage for adjusting and locking the shield in a number of different positions relative to the fuselage.

10. In an airplane, a fuselage, a multi-panel adjustable windshield having its panels adjustably hinged and mounted on the fuselage, the lower edges of the panels being shaped to conform to the curvature of the fuselage, holding members at the extremities of the lower frame members traveling in guides on the sides of the fuselage and locking levers fastening the holding members in any adjustable position on the guides.

11. In an airplane, a fuselage, a multi-panel windshield encircling the fore part of a cockpit, and hingedly mounted on said fuselage for fore and aft pivoting movements about a transverse axis, said panels being curved and the inner edges thereof being adjustably hinged together, guideways on the sides of the fuselage disposed at an angle to the transverse hinge axis, the outer panels having guide and holding members traversing said guideways and means for locking the panels in any adjustable position.

12. In a machine of the character set forth in claim 11 wherein the guideways are curved to conform to the curvature of the fuselage.

13. In a machine of the character set forth in claim 11 wherein the panels have their lower edges formed to conform to the curvature of the fuselage.

14. In a machine of the character set forth in claim 2 wherein the panels are triangularly shaped.

15. In an airplane of the character set forth in claim 2 wherein the panels are readily separable from each other at their inner edges.

16. In an airplane of the character set forth in claim 2 wherein the two inner panels are journalled about juxtaposed upwardly extending members at their inner edges, each panel being separately removable or assembliable upon its corresponding journal member and means for retaining said panels in the operative position.

17. In a machine of the character set forth in claim 2 wherein the windshield consists of two curved panels, the lower edges of the panels being disposed in substantially a common plane, with the upper edges being curved rearwardly and downwardly to meet said plane.

18. An adjustable windshield having a guide and holding member, a guideway traversed by said holding member, and locking means for said windshield including a plurality of cam sided locking notches rigidly carried adjacent the guideway and a pivoted spring pressed latch carried by the windshield for automatically riding up the cams and engaging said notches.

19. A multi-panel adjustable windshield for aircraft including three-sided panels adjustably hinged together at their inner edges, said windshield being mounted for pivoting movements about a transverse axis and locking means for locking the windshield in any adjusted position.

In testimony whereof, I have signed my name to this specification.

MICHAEL WATTER.